(12) United States Patent
Poulat et al.

(10) Patent No.: US 10,737,426 B2
(45) Date of Patent: Aug. 11, 2020

(54) METHOD OF MAKING A BOTTLE MADE OF FDCA AND DIOL MONOMERS AND APPARATUS FOR IMPLEMENTING SUCH METHOD

(75) Inventors: Francoise Poulat, Evian-les-Bains (FR); Philippe Reutenauer, Thonon-les-Bains (FR)

(73) Assignee: SOCIETE ANONYME DES EAUX MINERALES D'EVIAN et en abrege, "S.A.E.M.E", Evian-les-Bains (FR)

( * ) Notice: Subject to any disclaimer, the term of this patent is extended or adjusted under 35 U.S.C. 154(b) by 849 days.

(21) Appl. No.: 14/424,940

(22) PCT Filed: Aug. 31, 2012

(86) PCT No.: PCT/EP2012/067000
§ 371 (c)(1),
(2), (4) Date: Aug. 6, 2015

(87) PCT Pub. No.: WO2014/032731
PCT Pub. Date: Mar. 6, 2014

(65) Prior Publication Data
US 2015/0336320 A1      Nov. 26, 2015

(51) Int. Cl.
*B29C 49/00*  (2006.01)
*B29C 49/48*  (2006.01)
(Continued)

(52) U.S. Cl.
CPC ...... *B29C 49/0005* (2013.01); *B29C 49/4823* (2013.01); *B65B 3/022* (2013.01);
(Continued)

(58) Field of Classification Search
CPC ........ B29C 2049/4841; B29C 49/0005; B29C 49/4823; B29K 2067/04; B29K 2105/258; B29L 2031/7158; B65B 3/022
(Continued)

(56) References Cited

U.S. PATENT DOCUMENTS 4,042,657 A * 8/1977 Ostapchenko .......... B29C 49/46
                                                    264/40.1
4,177,239 A * 12/1979 Gittner .................... B29C 49/08
                                                    264/529
(Continued)

FOREIGN PATENT DOCUMENTS

| GB | 1523146 A    | 8/1978  |
|----|--------------|---------|
| JP | 2008-291244 A| 12/2008 |
| KR | 2000-0040988 A | 7/2000 |

OTHER PUBLICATIONS

Tom Van Aken, Avantium presentation to CT Forum Amsterdam, May 11, 2011.*

(Continued)

*Primary Examiner* — Hemant Desai
*Assistant Examiner* — Valentin Neacsu
(74) *Attorney, Agent, or Firm* — Marshall, Gerstein & Borun LLP

(57) ABSTRACT

A method of making a bottle (1) made of at least one thermoplastic polymer of at least one FuranDiCarboxylic Acid (FDCA) monomer and at least one diol monomer, comprising the steps of:
  providing a preform,
  placing the preform in a mold,
  blowing the preform to form the bottle (1) comprising an envelop (2) defining a housing,
  wherein, at the step of blowing the preform, the mold is heated at a temperature greater than or equal to 50° C., preferably comprised between 50° C. and 100° C., more preferably between 65° C. and 85° C.

23 Claims, 4 Drawing Sheets

Figure 1:
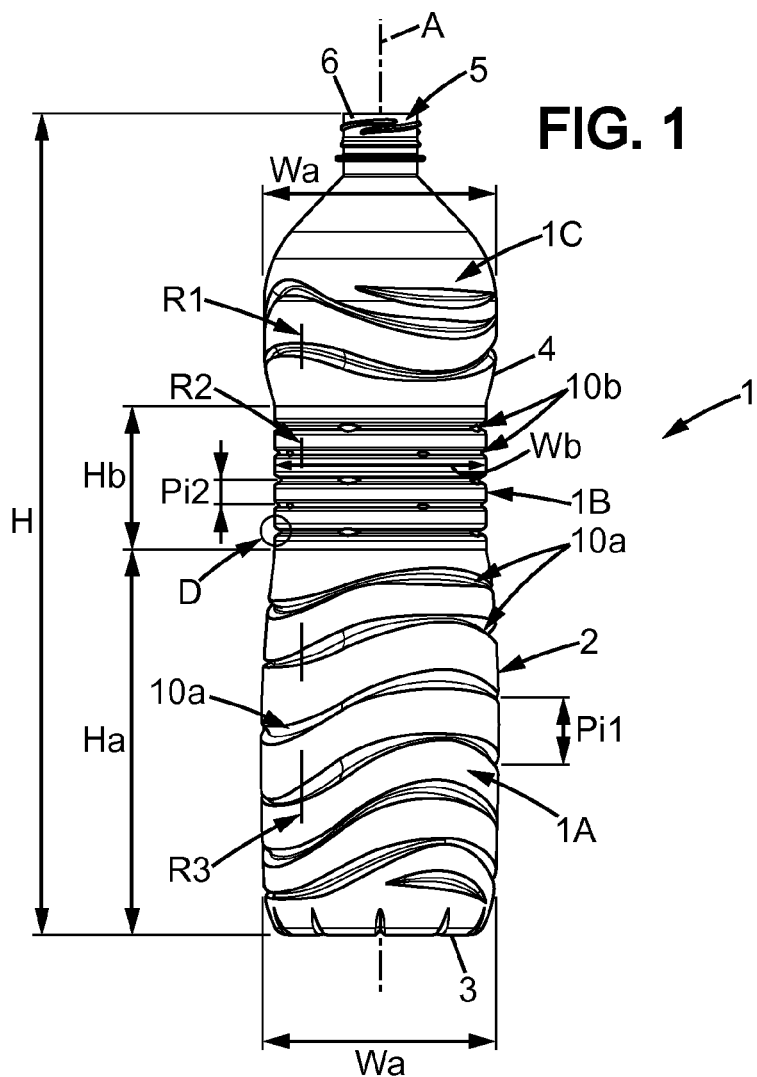

(51) Int. Cl.
*B65B 3/02* (2006.01)
*B65D 1/02* (2006.01)
*B29K 105/00* (2006.01)
*B29K 67/00* (2006.01)
*B29L 31/00* (2006.01)

(52) U.S. Cl.
CPC ......... *B65D 1/0207* (2013.01); *B65D 1/0223* (2013.01); *B29C 2049/4841* (2013.01); *B29K 2067/04* (2013.01); *B29K 2105/258* (2013.01); *B29L 2031/7158* (2013.01); *B65D 2501/0036* (2013.01)

(58) Field of Classification Search
USPC ............ 53/453, 452, 561; 264/535; 425/526
See application file for complete search history.

(56) References Cited

U.S. PATENT DOCUMENTS

| | | | | |
|---|---|---|---|---|
| 4,264,558 | A * | 4/1981 | Jacobsen | B29C 49/0005 264/523 |
| 4,950,152 | A * | 8/1990 | Brun, Jr. | B29C 45/0416 264/537 |
| 4,978,015 | A * | 12/1990 | Walker | B65D 1/0284 215/375 |
| 5,051,227 | A * | 9/1991 | Brun, Jr. | B29C 45/0416 264/537 |
| 5,389,332 | A * | 2/1995 | Amari | B29C 49/6445 264/526 |
| 2004/0065984 | A1* | 4/2004 | Ota | B29C 49/18 264/530 |
| 2005/0123699 | A1* | 6/2005 | Hirota | B29C 49/6481 428/35.7 |
| 2005/0140036 | A1* | 6/2005 | Hirota | B29C 49/18 264/40.1 |
| 2007/0257003 | A1* | 11/2007 | Colloud | B65D 1/0223 215/382 |
| 2009/0061132 | A1* | 3/2009 | Yamada | B29C 49/08 428/35.7 |
| 2010/0040813 | A1* | 2/2010 | Wada | B65D 1/0207 428/35.7 |
| 2010/0044928 | A1* | 2/2010 | Kurian | B29C 49/0005 264/544 |
| 2010/0047120 | A1* | 2/2010 | Adriansens | A61L 2/208 422/22 |
| 2010/0140835 | A1* | 6/2010 | Sun | B29C 45/0001 264/234 |
| 2010/0174044 | A1* | 7/2010 | Eritate | C08G 63/672 528/272 |
| 2011/0020902 | A1* | 1/2011 | Jagota | C07K 1/047 435/235.1 |
| 2011/0076432 | A1* | 3/2011 | Sakaguchi | B29C 49/6472 428/36.92 |
| 2011/0120902 | A1* | 5/2011 | Boswell | B65D 65/38 206/524.6 |
| 2011/0282020 | A1* | 11/2011 | Sipos | C08G 63/181 526/190 |
| 2012/0283452 | A1* | 11/2012 | Munoz De Diego | C07D 307/40 549/485 |
| 2013/0011631 | A1* | 1/2013 | Sakellarides | B32B 27/06 428/195.1 |
| 2013/0140264 | A1* | 6/2013 | Hanan | B65D 23/00 215/384 |
| 2013/0270212 | A1* | 10/2013 | Collias | B65D 1/40 215/316 |
| 2016/0009015 | A1* | 1/2016 | Bouffand | B65D 1/0207 53/453 |

OTHER PUBLICATIONS

Ed De Jong, YXY Building blocks, Presentation at IEA Bioenergy Task 42, Apr. 4, 2011.*
Search Report for PCT/EP2012/067000, dated Oct. 14, 2013.
Written Opinion for PCT/EP2012/067000, dated Oct. 14, 2013.
Brandau, Stretch Blow Molding, Preface, Chapters 1, 2, 4, 5 (partial), 9, 10, 11, and 13, Second Edition, William Andrew/Elsevier (2012).
Clark, Molecular and Microstructural Factors Affecting Mechanical Properties of Polymeric Cover Plate Materials, U.S. Department of Commerce, National Bureau of Standards, Center for Building Technology, Gaithersburg, MD (Jul. 1985).
De Jong et al., Furandicarboxylic Acid (FDCA), A Versatile Building Block for a Very Interesting Class of Polyesters, In: Smith et al. (eds.), Biobased Monomers, Polymers, and Materials, vol. 1105, American Chemical Society (Aug. 16, 2012).
Gomes et al., Synthesis and characterization of poly(2,5-furan dicarboxylate)s based on a variety of diols, J. Polymer Sci. Part A: Polymer Chemistry, 49:3759-68 (2011).
Gupta et al., PET Fibers, Films, and Bottles, pp. 362-388, In: Fakirov (ed.), Handbook of Thermoplastic Polymers: Homopolymers, Copolymers, Blends, and Composites, Wiley-VCH Verlag GmbH (2002).
Hiemenz et al., Factors That Affect the Glass Transition Temperature, pp. 491-495 In: Polymer Chemistry, Second Edition, CRC Press Taylor & Francis Group (2007).
Mangnus, The World's Next-Generation Polyester 100% Biobased Polyethylene Furanoate (PEF), Bioplastics Magazine, vol. 7, pp. 12-15 (Aug. 6, 2012).
Robertson, Processing and Converting of Thermoplastic Polymers, pp. 95-97 In: Food Packaging: Principles and Practice, Second Edition, CRC Press Taylor & Francis (2006).

* cited by examiner

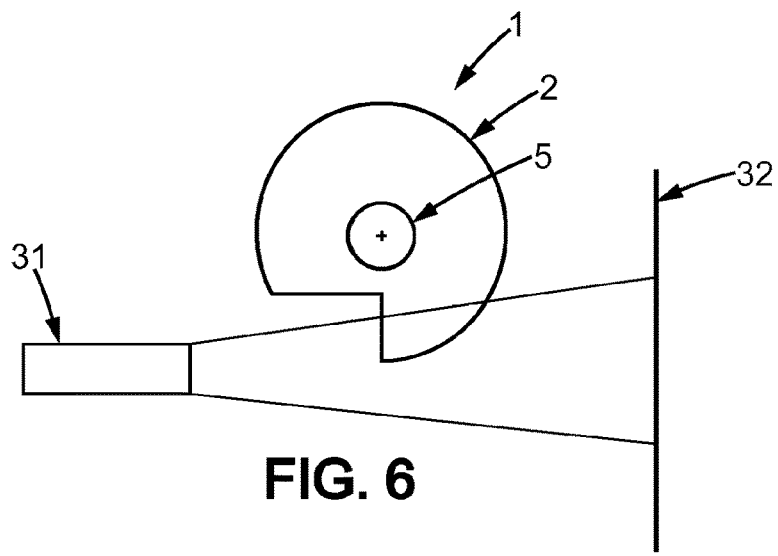
FIG. 6
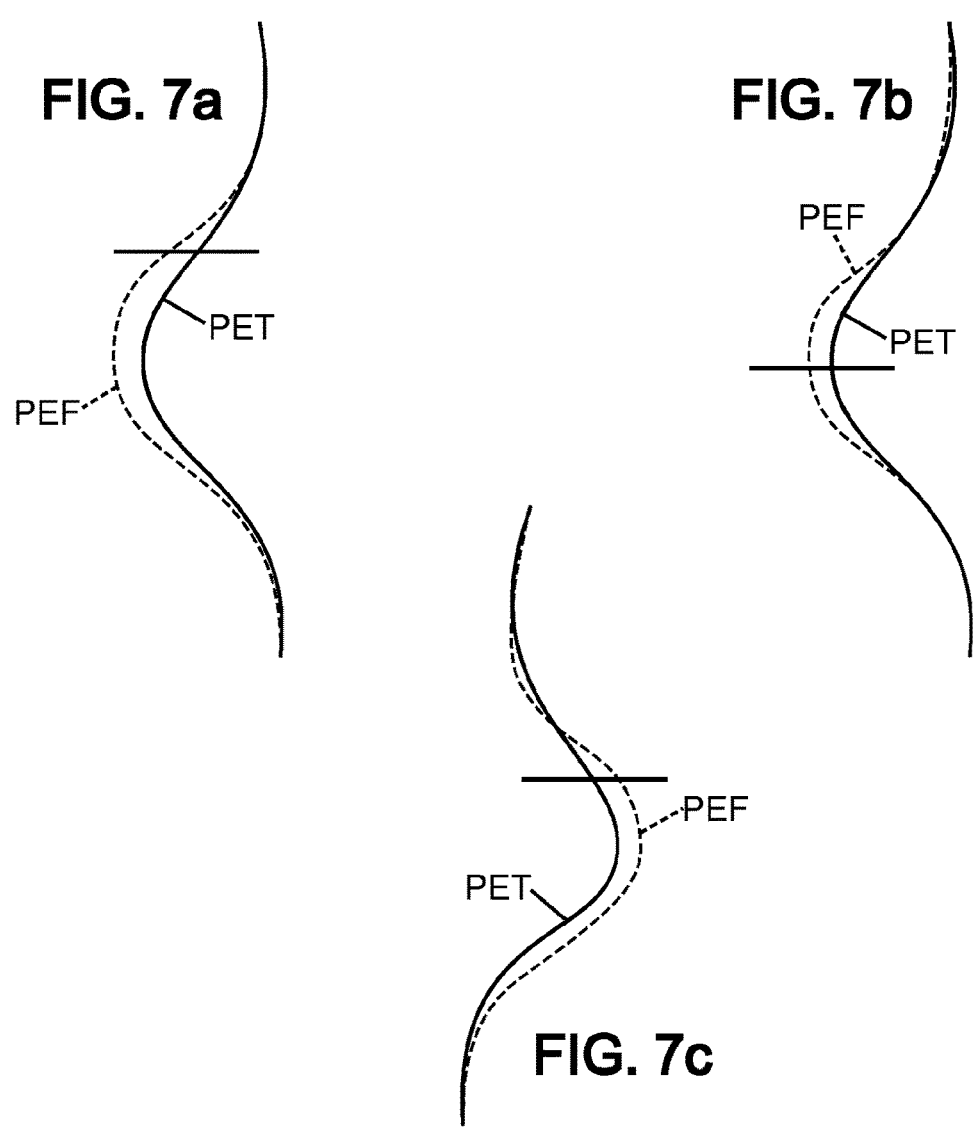
FIG. 7a
FIG. 7b
FIG. 7c

METHOD OF MAKING A BOTTLE MADE OF FDCA AND DIOL MONOMERS AND APPARATUS FOR IMPLEMENTING SUCH METHOD

TECHNICAL FIELD

The invention relates to a method of making a bottle made of FDCA and diol monomers and to an apparatus for implementing such method.

BACKGROUND ART AND TECHNICAL PROBLEMS

Bottles made of plastics are generally molded by a blow molding process.

PolyEthylenTerephthalate (PET) is a polymer generally used for making bottles. There is a demand for polymers based on renewables, for example that can be efficiently biosourced, to replace PET.

PolyEthylene Furanoate (PEF) is a polymer that can be at least partially biosourced. Document WO 2010/077133 describes, for example, appropriate processes for making a PEF polymer having a 2,5-furandicarboxylate moiety within the polymer backbone. This polymer is prepared by esterification of the 2,5-furandicarboxylate moiety [2,5-Furandicarboxylic acid (FDCA) or dimethyl-2,5-furandicarboxylate (DMF)] and condensation of the ester with a diol or polyol (ethylene glycol, 1,3-propanediol, 1,4-butanediol, 1,4-cyclohexanedimethanol, 1,6-hexanediol, 2,2-dimethyl-1,3-propanediol, poly(ethylene glycol), poly(tetrahydrofuran), glycerol, pentaerythritol). Some of these acid and alcohol moieties can be obtained from renewable crop raw material.

Bottles resulting from the known blow molding process are sensible to hot content at a temperature greater than or equal to 70° C. Indeed, filling such bottles with hot content generally results in permanent deformations disabling the bottles to stand.

The invention aims at addressing at least one of the above problems and/or needs.

BRIEF DESCRIPTION OF THE INVENTION

The Method of Manufacturing the Bottle

To that end, according to a first aspect, the invention proposes a method of making a bottle made of at least one thermoplastic polymer of at least one FuranDiCarboxylic Acid (FDCA) monomer, preferably 2,5-FuranDiCarboxylic Acid (2,5-FDCA) monomer, and at least one diol monomer, preferably monoethylene glycol (MEG) monomer, comprising the steps of:

providing a preform made of at least one thermoplastic polymer of at least one FDCA monomer and at least one diol monomer, said preform comprising a hollow tube extending along an axis and having a closed bottom end and an opened top end, placing the preform in a mold having a cavity and a blowing device adapted to supply the cavity with a fluid at a blowing pressure, blowing the preform through the opened top end to form the bottle comprising an envelop defining a housing, wherein, at the step of blowing the preform, the mold is heated at a temperature greater than or equal to 50° C., preferably comprised between 50° C. and 100° C., more preferably between 65° C. and 85° C.

It has been surprisingly found that blowing the thermoplastic polymer made of FDCA and diol monomers, such as polyethylene furanoate (PEF), in a heated mold enables the bottle to better withstand the deformations when filled with hot content. In particular, bottles made with the method of the invention could still stand after having been filled with hot content whereas PET bottles blown either in cold or heated molds could no longer stand.

In embodiments, the method of the invention may comprise one or several of the following features:

the step of blowing the preform comprises maintaining the bottle in contact with the mold for a time period between 0.5 s and 5.0 s, preferably between 1 s and 3 s, at the step of blowing the preform, the blowing pressure is less than or equal to 35 bars, preferably 30 bars, more preferably 25 bars, more preferably 20 bars, more preferably 15 bars, more preferably 10 bars, the cavity of the mold comprises at least one imprinting member, and the step of blowing the preform comprises providing the envelop with at least one imprint, the step of blowing the preform comprises forming the imprint having two coplanar edges and an intermediate portion between the two edges, said intermediate portion presenting an apex shifted with respect to the two edges, the step of blowing the preform comprises forming the envelop having an internal surface delimiting the housing and an external surface opposite to the internal surface, the imprint consisting in a local deformation of both internal and external surfaces of the envelop between two adjacent portions of the envelop, said local deformation being chosen between a deformation in recess with respect to the two adjacent portions and in relief with respect to the two adjacent portions.

The thermoplastic polymer made of FDCA and diol monomers, such as polyethylene furanoate (PEF), has also been found to allow an improved imprinting compared to PET. In particular, the thermoplastic polymer of the invention showed an enhanced ability to follow a profile of an imprinting member of a mold thereby making it possible to get some smaller and more precise features imprinted onto the bottle. In addition, the imprints on the bottle made with the method of the invention also showed better resistance to deformations when the bottle is filled with hot content.

The method may further comprise a step of filling the bottle with a hot content, especially at a temperature greater than or equal to 70° C., preferably comprised between 75° C. and 100° C., more preferably comprised between 81° C. and 98° C., more preferably between 83° C. and 92° C., more preferably between 83° C. and 88° C., and most preferably between 83° C. and 85° C. In particular, at the step of filling the bottle, the bottle may be filled with a liquid at a hot temperature, especially at a temperature greater than or equal to 70° C., preferably comprised between 75° C. and 100° C., more preferably comprised between 81° C. and 98° C., more preferably between 83° C. and 92° C., more preferably between 83° C. and 88° C., and most preferably between 83° C. and 85° C.

The liquid that can be filled in the bottles can be for example water or a beverage and especially a sugar containing beverage, such as a soda for example a cola beverage, preferably carbonated, or a fruit juice, optionally carbonated and optionally mixed with water in suitable proportions. The liquid can also be a vitamin beverage or an energy drink, optionally aromatized and optionally preservative free.

The bottle, filled or empty, can be closed by a closure, for example a cap.

Apparatus for Implementing the Method

According to a second aspect, the invention proposes an apparatus for implementing the method previously defined, comprising a mold having a cavity and a blowing device adapted to supply the cavity with a fluid at a blowing pressure, wherein the apparatus further comprises a heating device adapted to heat the mold at a temperature greater than or equal to 50° C., preferably comprised between 50° C. and 100° C., more preferably between 65° C. and 85° C.

In embodiments, the apparatus of the invention may comprise one or several of the following features:

the blowing device is controlled to supply the cavity with the fluid at the blowing pressure less than or equal to 35 bars, preferably 30 bars, more preferably 25 bars, more preferably 20 bars, more preferably 15 bars, more preferably 10 bars, the cavity of the mold comprises at least one imprinting member adapted to provide the envelop with at least one imprint, the apparatus further comprises a filling unit suitable for filling the bottle with a hot content, especially at a temperature greater than or equal to 70° C., preferably comprised between 75° C. and 100° C., more preferably comprised between 81° C. and 98° C., more preferably between 83° C. and 92° C., more preferably between 83° C. and 88° C., and most preferably between 83° C. and 85° C., the apparatus further comprises a closing unit suitable for closing the bottle with a closure such as a cap.

The Polymer Constituting the Bottle: Structure Preparation

The polymer comprises moieties corresponding to a FDCA monomer, preferably 2,5-FDCA, and moieties corresponding to a diol monomer, preferably a monoethylene glycol. The polymer is typically obtained by polymerizing monomers providing such moieties in the polymer. To that end one can use as monomers FDCA, preferably 2,5-FDCA or a diester thereof. Thus the polymerization can be an esterification or a trans-esterification, both being also referred to as (poly)condensation reactions. One preferably uses dimethyl-2,5-furandicarboxylate (DMF) as a monomer.

The 2,5-FDCA moiety or monomer can be obtained from a 2,5-furandicarboxylate ester is an ester of a volatile alcohol or phenol or ethylene glycol, preferably having a boiling point of less than 150° C., more preferably having a boiling point of less than 100° C., still more preferably diester of methanol or ethanol, most preferably of methanol. 2,5-FDCA or DMF are typically considered as biosourced.

The 2,5-FDCA or ester thereof may be used in combination with one or more other dicarboxylic acid, esters or lactones.

The diol monomer can be an aromatic, aliphatic or cycloaliphatic diol. Examples of suitable diol and polyol monomers therefore include ethylene glycol, diethylene glycol, 1,2-propanediol, 1,3-propanediol, 1,4-butanediol, 1,5-pentanediol, 1,6-hexanediol, 1,4-cyclohexanedimethanol, 1,1,3,3-tetramethylcyclobutanediol, 1,4-benzenedimethanol, 2,2-dimethyl-1,3-propanediol, poly(ethylene glycol), poly(tetrahydofuran), 2,5-di(hydroxymethyl) tetrahydrofuran, isosorbide, glycerol, 25 pentaerythritol, sorbitol, mannitol, erythritol, threitol. Ethylene glycol, 1,3-propanediol, 1,4-butanediol, 1,4-cyclohexanedimethanol, 1,6-hexanediol, 2,2-dimethyl-1,3-propanediol,poly(ethylene glycol), poly(tetrahydofuran), glycerol, and pentaerythritol, are particularly preferred diols.

In the preferred embodiment the diol is Ethylene Glycol (MonoEthylene Glycol—MEG), preferably biosourced. For example biosourced MEG can be obtained from ethanol which can also be prepared by fermentation from sugars, (e.g. glucose, fructose, xylose) that can be obtained from crop or agricultural by-products, forestry byproducts or solid municipal waste by hydrolysis of starch, cellulose, or hemicellulose. Alternatively, biosourced MEG can be obtained from glycerol, that itself can be obtained as waste from biodiesel.

The thermoplastic polymer, which is the raw material of the bottle according to the invention, can also comprise other diacid monomers, such as dicarboxylic acid or polycarboxylic acid, for instance therephthalic acid, isophtahalic acid, cyclohexane dicarboxylic acid, maleic acid, succinic acid, 1,3,5-benzenetricarboxylic acid. Lactones can also be used in combination with the 2,5-furandicarboxylate ester: Pivalolactone, eppilon-caprolactone and lactides (L,L; D,D; D,L). Even if it is not the most preferred embodiment of the invention, the polymer can be non linear, branched, thanks to the use of polyfunctional monomers (more than 2 acid or hydroxyl functions per molecule), either acid and/or hydroxylic monomers, e.g polyfunctional aromatic, aliphatic or cycloaliphatic polyols, or polyacids.

According to a preferred embodiment of the invention, the polymer is a PEF material using biosourced 2,5-FDCA and biosourced MonoEthylene Glycol. Indeed, 2,5-FDCA comes from 5-hydroxymethylfurfural (5-HMF) which is produced from glucose or fructose (obtained from renewable resources). MonoEthylene Glycol can be obtained from ethanol which can also be prepared by fermentation from sugars, (e.g. glucose, fructose, xylose) that can be obtained from crop or agricultural by-products, forestry by-products or solid municipal waste by hydrolysis of starch, cellulose, or hemicellulose. Alternatively, MonoEthylene Glycol can be obtained from glycerol, that itself can be obtained as waste from biodiesel.

This is referred to as a 100% biobased or biosourced PEF as most of the monomers used are considered as biosourced. As some co-monomers and/or some additives, and/or some impurities and/or some atoms might not be biosourced, the actual amount of biosourced material can be lower than 100%, for example between 75% and 99% by weight, preferably from 85 to 95%. PEF can be prepared according to the public state of the art in making PEF, for example as described in document WO 2010/077133. Bottles can be made with such a material for example by Injection Blow Molding (IBM) processes, preferably by Injection Stretch Blow Molding (ISBM) processes. Such bottle can have similar properties than previously publicly described with PEF wherein 2,5-FDCA or MonoEthylene Glycol are not biosourced. Such properties, including mechanical properties can be improved compared to PET.

The term "polymer" according to the present invention encompasses homopolymers and copolymers, such as random or block copolymers.

The polymer has a number average molecular weight (Mn) of at least 10,000 Daltons (as determined by GPC based on polystyrene standards). Mn of the polymer is preferably comprised between—in daltons and an increasing order of preference—10000 and 100000; 15000 and 90000; 20000 and 80000; 25000 and 70000; 28000 and 60000.

According to a remarkable feature of the invention, the polymer polydispersity index (PDI)=Mw/Mn (Mw=weight average molecular weight), is defined as follows—in an increasing order of preference—: $1<PDI\leq5$; $1.1\leq PDI\leq4$; $1.2\leq PDI\leq3$; $1.3\leq PDI\leq2.5$; $1.4\leq PDI\leq2.6$; $1.5\leq PDI\leq2.5$; $1.6\leq PDI\leq2.3$.

Generally, the process for preparing the polymer comprises the following steps: (trans)esterification of the 2,5-FDCA dimethyl ester, of the 2,5-FDCA diglycerylester;

(poly)condensation reaction in the presence of a tin(IV) based catalyst and possibly a purification step. The process for preparing PEF can comprise a Solid State Polymerization (SSP) step.

DETAILED DESCRIPTION OF THE INVENTION

Figure 2:
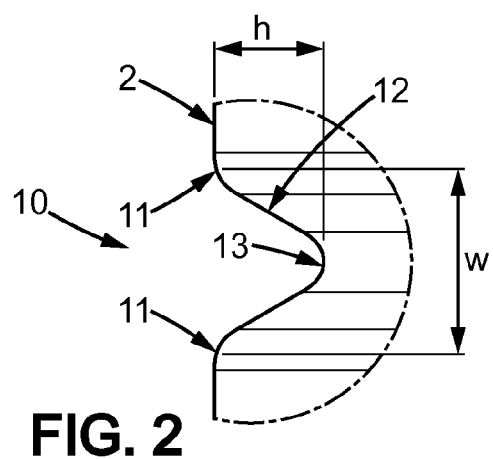
Figure 3:
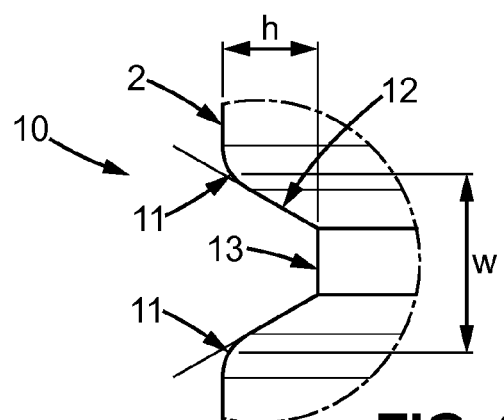
Figure 4:
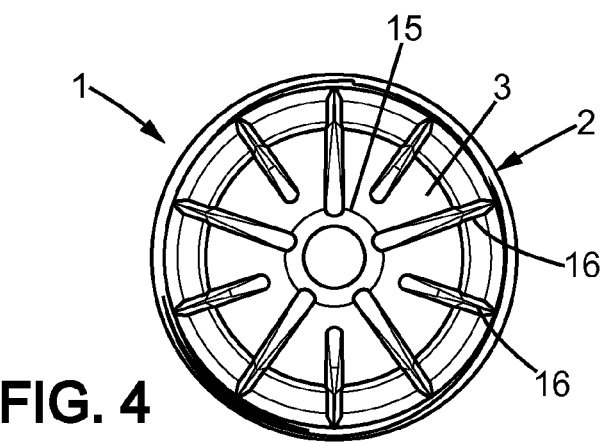
Figure 5:
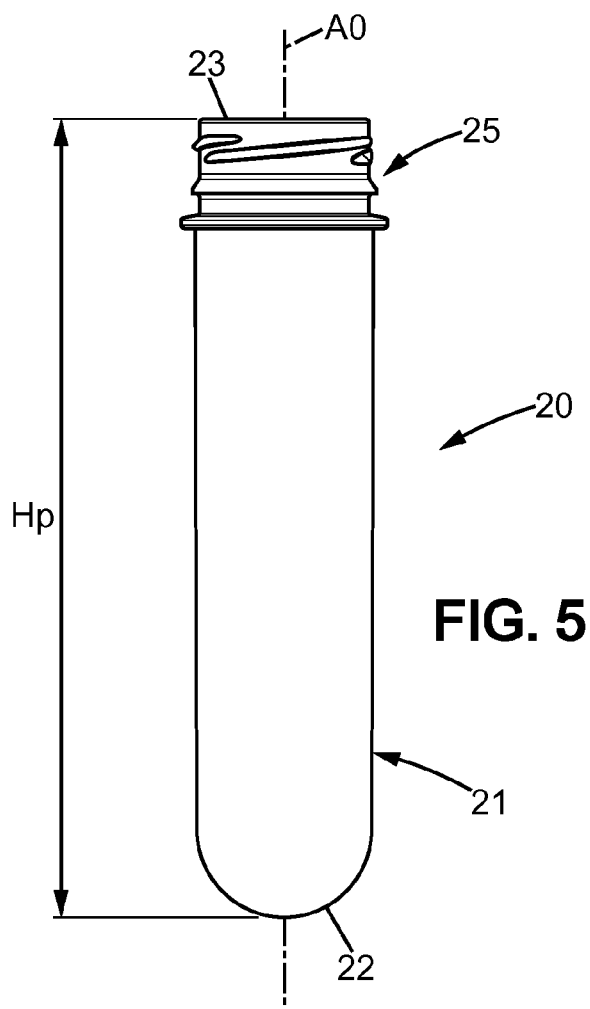
Figure 8:
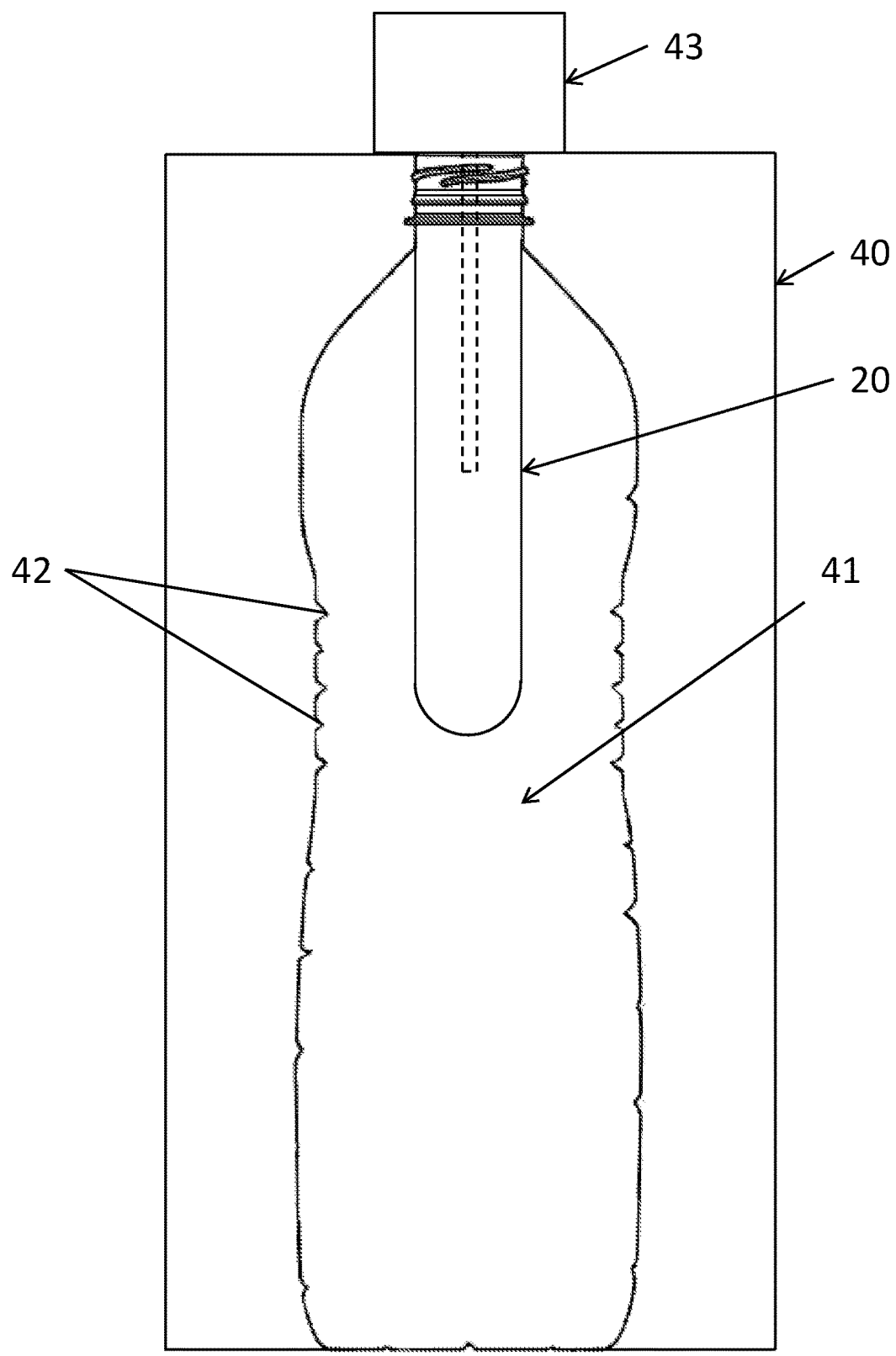

Further objects and advantages of the invention will emerge from the following disclosure of a particular embodiment of the invention given as a non limitative example, the disclosure being made in reference to the enclosed drawings in which:

FIG. 1 is a side view of a bottle comprising an envelop provided with grooves according to an embodiment of the invention, FIG. 2 is an enlarged view of the detail referenced D on FIG. 1 representing of one of the grooves of the bottle, FIG. 3 is an enlarged view of the detail referenced D on FIG. 1 representing a variant of one of the grooves of the bottle, FIG. 4 is a bottom view of the bottle of FIG. 1, FIG. 5 is a side view of a preform used in a blow molding process for making the bottle of FIG. 1, FIG. 6 is a schematic view of an experimental set-up to obtain a groove profile of one of the grooves of the bottle, FIGS. 7a, 7b and 7c are respective representations of the groove profiles of the grooves referenced R1, R2, and R3 on FIG. 1 obtained by the experimental set-up of FIG. 6, the groove profiles being superposed on groove profiles of corresponding grooves of a reference bottle identical to the bottle of FIG. 1 except that the reference bottle is made of PET, FIG. 8 is a side view of a mold, its cavity and its imprinting member for forming a bottle.

On the Figures, the same reference numbers refer to the same or similar elements.

FIG. 1 represents a bottle 1 suitable for containing for example a liquid such as water. The bottle 1 is cylindrical along an axis A, of circular cross section, and comprises an envelop 2. The envelop 2 comprises a bottom 3 perpendicular to the axis A, and a lateral wall 4 extending from the bottom 3 along the axis A. At a free end, opposite to the bottom 3, the lateral wall 4 forms a neck 5 narrowing towards the axis A. The bottom 3 and the lateral wall 4 both have internal surfaces delimiting a housing, and external surfaces opposite to the internal surfaces. In the following of the description, the terms "inside", "inwards", "inwardly" and similar will refer to an element situated close to or directed towards the housing or the axis, and the terms "outside", "outwards", "outwardly" and similar will refer to an element situated apart from or directed opposite to the housing or the axis.

As a non-limitative example, the bottle 1 may have a height H measured along the axis A of 317.75 mm. The lateral wall 4 may present a curved contour along the axis A defining an intermediate narrow portion 1B, which may have a maximum width Wb measured perpendicularly to the axis A of 80 mm, between two large portions 1A, 1C, which each may have a maximum width Wa of 89 mm. A first 1A of the large portions, close to the bottom 3, may have a height Ha of 148 mm and the intermediate narrow portion 1B may have a height Hb of 56 mm. The neck 5 may have a frustoconical portion attached to a second 1C of the large portions, apart from the bottom 3, and a cylindrical portion. The cylindrical portion of the neck 5 is provided with a thread 6 on the external surface to enable a cap to be screwed onto the neck 5 for closing the bottle 1.

As can be seen on FIGS. 1 to 4, the envelop 2 is provided with imprints each consisting in a local deformation of both internal and external surfaces of the envelop 2 between two adjacent portions of the envelop 2.

In the illustrated embodiment, the imprints comprise a plurality of adjacent circumferential grooves 10a, 10b extending at least partly around the axis A on the lateral wall 4. In particular, each circumferential groove 10b of the intermediate narrow portion 1B is annular and extends circumferentially substantially in a plan perpendicular to the axis A, whereas each circumferential groove 10a of the large portions 1A, 1C is annular and undulates circumferentially with respect to a plan perpendicular to the axis A. The circumferential grooves 10a, 10b are regularly arranged on each portion of the lateral wall 4 according to a pitch Pi along the axis A. Two adjacent circumferential grooves 10a of the large portions 1A, 1C are therefore separated from each other of a distance measured along the axis A corresponding to a first pitch Pi1. Two adjacent circumferential grooves 10b of the intermediate narrow portion 1B are separated from each other of a distance measured along the axis A corresponding to a second pitch Pi2.

In particular, as can be seen on FIG. 2, each circumferential groove 10a, 10b consists in a local deformation in recess with respect to the two adjacent portions of the envelop 2. Each circumferential groove 10a, 10b has then two edges 11, i.e., substantially arranged in a plane parallel to the axis A of the bottle 1, and an intermediate portion 12 between the two edges 11. The intermediate portion 12 or each groove presents a curved apex 13 shifted inwardly, i.e. towards the axis A, with respect to the two edges 11. In a variant shown on FIG. 3, the apex 13 may be flat. Each circumferential groove 10 presents a width w measured between the two edges 11 and a maximum height h measured between the edges 11 and the apex 13.

As a non-limitative example, the width w and the maximum height h may be such that the ratio h/w of the maximum height to the width is—in an increasing order of preference—greater than or equal to 0.8; 1.0; 1.2; and preferably comprised between 1.2 and 200; 1.2 and 50; 1.2 and 20.

Besides, the pitch Pi and the maximum height h of the circumferential groove may be such that:

when the maximum height is equal to 2 mm, then the pitch is lower than or equal to, in an increasing order of preference, 5 mm, 4 mm, 3 mm, 2 mm or 1 mm, when the pitch is equal to 5 mm, then the maximum height is greater than or equal to, in an increasing order of preference, 2 mm, 3 mm, 4 mm, 6 mm or 8 mm.

As can be seen on FIG. 4, on the bottom 3, the imprints also comprise a central dome imprint 15 and radial grooves 16 extending radially with respect to the axis A. The dome imprint 15 extends inwardly from an annular edge to an apex arranged on the axis A. The dome imprint 15 thereby presents a concavity oriented outwardly. As for the circumferential grooves 10a, 10b, each radial groove 16 curves inwardly from two coplanar edges.

Although the invention has been disclosed with a cylindrical bottle comprising several grooves as imprints, the invention is not limited thereto. In particular, the bottle could be of any other suitable shape, such as cylindrical of elliptic, polygonal or other cross-section. Besides, the envelop could be provided with one or several imprints consisting in a local deformation in recess, as previously disclosed in relation with grooves, or in a local deformation in relief, i.e. protruding, with respect to the two adjacent portions. In the later case, the intermediate portion of such imprint presents an apex shifted outwardly, i.e. opposite to the axis A, with respect to the two edges. Thus, the imprint could be of any kind, especially selected from the group consisting of splines, grooves, ribs, embossings, decorative patterns, gripping elements, trademark indications, production indications, Braille characters and a combination thereof.

The bottle 1 can be molded, for example by a blow molding process, from a plastic material chosen in accordance with the content with which the bottle is intended to be filled. In particular, the plastic material is preferably at least partly biosourced and the bottle is filled with a liquid, such as water or another beverage, before a cap is screwed and sealed to the neck 5.

According to the invention, the above described bottle 1 is made of a thermoplastic polymer of at least one FuranDiCarboxylic Acid (FDCA) monomer and at least one diol monomer. In particular, the thermoplastic polymer is a PolyEthyleneFuranoate (PEF) based on biobased 2,5-FDCA and biobased MonoEthyleneGlycol (MEG). The preparation of the polymer and the manufacture of the bottle are detailed below in the following example.

Example

Materials 2,5-furandicarboxylic acid (2,5-FDCA) and dimethyl-2, 5-furandicarboxylate (DMF) for example prepared according to WO 2011/043660.

MEG: biosourced MEG, as diol.

PET (comparative): PET w170 supplied by Indorama, with the following features:
 glass transition temperature, Tg=75° C.,
 melting temperature, Tf=235° C.,
 density (amorphous), d=1.33.

Preparation of the PEF Polymer

Polymerizations are carried out in a 15 L stirred batch reactor. Dimethyl 2,5-furandicarboxylate (5.0 kg; 27.17 mol), bio-Ethylene glycol (4.02 kg; 64.83 mol) and Ca acetate monohydrate (8.48 g; 10.4 mmol) are mixed under nitrogen in the predried reactor, while heating to a temperature of 130° C. when the methanol starts to distill off. The temperature is kept at about 130° C. till most of the methanol is distilled out. Subsequently, the temperature is raised to 190° C. (mantle temperature) under nitrogen flush for 2 hours. Then Sb glycolate (3.48 g $Sb_2O_3$) dissolved in 200 mL bioethylene glycol was added under stirring at 40 rpm. The temperature is increased to 210° C. while vacuum is applied slowly. At 300 mbar most of the ethylene glycol is distilled off. Finally the vacuum is reduced as much as possible, but definitely below 1 mbar. The mantle temperature is raise to 240° C. and the molecular weight increase was monitored by measuring the stirrer torque. The polymer that is obtained from the reactor is shown to have a Mn of 16000 g/mol. And a Mw/Mn of 2.5. Solid state polymerization is performed in a tumble dryer. During the first 12 hours, crystallization of the polymer is performed at 145° C. Subsequently, during a period of 72 hours, the temperature is slowly raised to above 200° C. Care is taken that polymer particles do not stick together. After 72 hours, the polymer has:
 number average molecular weight measured by GPC, Mn=30000,
 glass transition temperature, Tg=85° C.,
 melting temperature, Tf=210° C.,
 density (amorphous), d=1.42,
 polydispersity index, Mw/Mn PDI=2.1.

GPC measurements are performed on a Merck-Hitachi LaChrom HPLC system equipped with two PLgel 10 mm MIXED-C (300×7.5 mm) columns. Chloroform:2-chlorophenol 7:3 solvent mixture was used as eluent. Calculation of the molecular weight was based on polystyrene standards and carried out by Cirrus™ PL DataStream software. UV-visible spectra and absorbances were recorded on a Helios (ThermoSPectronic=spectrophotometer.

Manufacturing Method of the Bottle

The bottle according to the invention is preferably manufactured by a blow molding process implementing an apparatus comprising:
 a mold 40, such as a Sidel SBO 1 machine, having a cavity 41 comprising one or several imprinting members 42, and a blowing device 43 adapted to supply the cavity with a fluid at a blowing pressure, and
 a heating device adapted to heat the mold.

The heating device can comprise a hot fluid circuit. The hot fluid circuit may comprise conduits running through the mold and in which a hot fluid may flow, and a hot fluid supplier connected to the conduits. For example, the fluid can be water.

Each imprinting member 42 has two edges and an intermediate portion, between the two edges, conformed to form the desired imprint on the envelop 2 of the bottle 1. In particular, the intermediate portion of each imprinting member has an apex shifted with respect to the two edges. In the illustrated embodiment, for forming grooves on the envelop 2 of the bottle 1, the intermediate portion is in relief with respect to the two edges and presents an apex, preferably flat, shifted inwardly (as regards to the cavity, i.e., towards a central axis of the cavity) with respect to the two edges. For example, the imprinting members have a width w=2.5 mm between the two coplanar edges and a height h=6.5 mm between the edges and the apex.

The blow molding process implements a 30 g preform 20 made of the suitable thermoplastic polymer, such as the thermoplastic polymer PEF, the preparation of which has been hereinabove described. As can be seen on FIG. 5, the preform 20 comprises a hollow tube 21 extending along an axis A0 and having a closed bottom end 22 and an opened top end 23. A top portion 25 of the preform 20 close to the opened top end 23 is conformed as the neck 5 of the bottle 1. The remaining portion of the tube 21 is cylindrical of circular cross-section with a diameter substantially equal to that of the top portion 25.

As a non-limitative example, the preform 20 may have a height Hp measured along the axis A0 of 121 mm and an internal diameter varying from 21 mm close to the closed bottom end 22 to 25 mm close to the opened top end 23.

To manufacture 30 g preforms 20 of the above disclosed type, a 20 kg sample of the above disclosed thermoplastic polymer PEF is used in a Netstal Elion 800 injection molding machine. The matter was heated to 250° C., with a cycle time of 19.92 s. The PEF preforms 20 where heated to a surface temperature of 120° C. After the preforms 20 have been placed in the mold, the preforms 20 can be blown through injection of the fluid at the blowing pressure within the preform through the opened top end 23. Thanks to the use of the thermoplastic polymer PEF, the blowing pressure can be lowered to 35 bars or less, and especially, in an increasing order of preference, to 30 bars, 25 bars, 20 bars, 15 bars or 10 bars. In particular, the preforms 20 were blown with a blowing pressure of 34 bars to bottles 1 of the above disclosed type, namely a 1.5 L type with a design typical of still water, presenting grooves.

According to the invention, as the preform 20 is held in the mold and blown, the mold is heated at a temperature greater than or equal to 50° C., preferably comprised between 50° C. and 100° C., more preferably between 65° C. and 85° C. For PEF preforms 20, three mold temperatures were tested: cold (10-13° C.), 70° C. and 80° C. In addition, after the fluid has been supplied in the preform to form the bottle, the bottle is maintained in contact with the mold for a time period between 0.5 s and 5.0 s, preferably between 1 s and 3 s.

Preforms of similar shape were made with PET w170 from Indorama at a 30 g weight for comparison with the thermoplastic polymer PEF. The matter was heated to 265° C., with a cycle time of 20.04 s. The PET preforms were heated to a surface temperature of 108° C.-110° C., placed in the mold and blown, at a blowing pressure greater than 35 bars, to the same 1.5 L type bottles with a design typical of still water, presenting grooves, hereafter referred to as reference bottles. For PET preforms, two mold temperatures were tested: cold (10° C.-13° C.) and 70° C. Good material distribution was achieved in all cases.

The so produced bottles are identical to the above described bottle 1.

Tests and Results

In order to assess the surprising moldability improvement brought by the PEF versus PET, some tests are carried out.

The grooves of each bottle have each an imprint profile, here a groove profile, in a plane transverse to the edges, such as a plane parallel to a longitudinal median plane containing the axis A. The groove profile is composed of a plurality of points each having a radius of curvature.

A comparison of groove profiles of the grooves of a test bottle 1 molded from PEF and of the grooves of a reference bottle molded from PET is made. As explained above, the PEF test bottle 1 and the PET reference bottle have been molded by a same mold having the same imprinting members. Therefore, each imprinting member may form corresponding grooves on the PEF test bottle 1 and on the PET reference bottle.

For the comparison, the groove profiles, and especially the radius of curvature at each point of the groove profiles, are measured according to a protocol described below implementing an experimental set-up 30 shown on FIG. 6.

At first, magnified projections of the groove profiles of the corresponding imprints of the PEF test and PET reference bottles are obtained.

As shown on FIG. 6, these magnified projections are made using a profile projector 31 that is a device projecting a magnified profile image of an area or feature of a workpiece onto a screen 32. Here, the profile projector 31 and the screen 32 were used for measuring the groove profiles of the bottles. They could, however, be used for measuring any other structural and/or ornamental feature imprinted on the bottles. The measurements were made using a Deltronic DH350.

Numbers are given to the different PEF test and PET reference bottles to differentiate them, and their orientation regarding to the mold is checked. The positions of the grooves to be measured are precisely marked. In particular, in the illustrated embodiment, the grooves identified, on FIG. 1, R1 (on the second large portion 1C), R2 (on the intermediate portion 1B) and R3 (on the first large portion 1A) are measured for the PEF test bottle 1 and the PET reference bottle.

The PEF test and PET reference bottles are cut along a transverse joint plan using a cutter with a blade oriented orthogonally to the envelop and moved from the outside to the inside, to avoid creating any defect on the external surface that would alter the quality of the groove profile measurement. A part of the PEF test and PET reference bottles corresponding to a sector of about 90° is removed to allow the measurement.

The measurement of the groove profile of each groove is made using an appropriate magnification so that the groove is displayed on the whole screen 32. For example, the magnification is at least 10 fold.

The PEF test bottle 1 is placed on a measuring table and its stability is checked. The PEF test bottle 1 is oriented with respect to the profile projector 31 so that the plan that was cut is orthogonal to an incident light beam emitted by the profile projector 31. The groove R1 of the test PEF bottle 1 is measured by vertical translation of the object. A focusing of an image on the screen 32 representing the magnified imprint profile of the groove R1 is ensured. When the image is sharp, a transparent sheet is fixed on the screen 32, and held in place. The image projected on the screen 32 is drawn by hand, and identified precisely. The magnified groove profiles of the other grooves R2 and R3 of the PEF test bottle 1 are successively drawn the same way.

The magnified groove profiles of the corresponding grooves R1, R2 and R3 of the PET reference bottle are successively drawn the same way. Also for the mold, a similar measurement is made, done using the reflection of a light shone on the insert mold.

Secondly, the images of the magnified groove profiles of the corresponding grooves of the PEF test and PET reference bottles are superposed for comparison of groove profiles and determination of a quality of the imprinting. Especially:

FIG. 7a represents the superposed images of the magnified groove profiles of the corresponding grooves R1 of the PEF test and PET reference bottles, FIG. 7b represents the superposed images of the magnified groove profiles of the corresponding grooves R2 of the PEF test and PET reference bottles, FIG. 7c represents the superposed images of the magnified groove profiles of the corresponding grooves R3 of the PEF test and PET reference bottles.

From the superposed images of each corresponding groove, pairs of corresponding points can be defined. For example, each pair of corresponding points comprise one point of the magnified projection of one of the groove profile of the PEF test bottle 1 and one point of the magnified projection of the corresponding groove profile of the PET reference bottle arranged on a same line perpendicular to the axis of the bottles.

Then, to determine the quality of the imprinting, the radii of curvature of each pair of corresponding points of the magnified projections of the groove profiles are measured. Therefore, for each pair of corresponding points, the radius of curvature $Rc^{PEF}$ of the groove profile of the groove of the PEF test bottle 1 and the radius of curvature $Rc^{PET}$ of the groove profile of the corresponding groove of the PET reference bottle are measured.

As can be seen on FIGS. 7a to 7c, the radius of curvature $Rc^{PEF}$ of the groove profile of the PEF test bottle 1 at each point is able to reach lower values than the radius of curvature $Rc^{PET}$ of the corresponding point of the groove profile of the PET reference bottle. For example, the radius of curvature $Rc^{PEF}$ at each point of the groove profile of the PEF test bottle 1 can be lower than 1 mm, preferably lower than 0.7 mm, more preferably lower than 0.5 mm, more preferably lower than 0.3 mm.

Therefore, the profile of the grooves born by the PEF test bottle can precisely follow a contour of the imprinting members of the mold, whereas that of the PET reference bottle systematically display a less accurate imprinting.

Hotfill Test 30 g 1.5 L still water bottles made in PEF and PET, for all blowing condition (molds cold, 70° C. for PET and PEF and 80° C. for PEF). For all sorts, one bottle was filled with water heated to 83° C. to a level of 30 mm below the brimful level. Caution was taken not to heat the neck, and the bottles were closed by screw caps. The bottles were left standing for 30 s, then layed down for 30 s, and standing 1 more minute before being cooled to bellow 40° C. by immersion in water.

The deformation of the bottles was much more important for the PET bottles either blown in cold or heated (70° C.) molds, on the bottom and the ribs. A strong radial contraction occurred. This resulted in the PET bottle no longer being able to stand, and being much elongated.

For the PEF bottles, the rib deformation was unperceptible, with the height of the bottle being unchanged. For the cold molded PEF bottle, the bottom was less deformed than the PET ones, but still enough for the bottle no longer being able to stand. On contrary, for the PEF bottles blown on heated molds (both 70° C. and 80° C.), the bottom distortion was not noticeable, and the bottles could still stand up.

Although disclosed in relation to a bottle filled with water at a temperature of 83° C., the bottle could be filled with any other liquid or content at a hot temperature, especially at a temperature greater than or equal to 70° C., preferably comprised between 75° C. and 100° C., more preferably comprised between 81° C. and 98° C., more preferably between 83° C. and 92° C., more preferably between 83° C. and 88° C., and most preferably between 83° C. and 85° C. In particular, the content can be chosen between water or a beverage and especially a sugar containing beverage, such as a soda for example a cola beverage, preferably carbonated, or a fruit juice, optionally carbonated and optionally mixed with water in suitable proportions. The liquid can also be a vitamin beverage or an energy drink, optionally aromatized and optionally preservative free.

The invention claimed is:

1. A method of making a final molded bottle made of at least one thermoplastic polymer of at least one FuranDiCarboxylic Acid (FDCA) monomer and at least one monoethylene glycol (MEG) monomer, the bottle comprising an envelope defining a housing, the envelope comprising a bottom and a lateral wall extending from the bottom, comprising the steps of:
   providing a preform made of at least one thermoplastic polymer of at least one FDCA monomer and at least one monoethylene glycol (MEG) monomer, said preform comprising a hollow tube extending along an axis and having a closed bottom end and an opened top end,
   placing the preform in a single mold having a cavity conformed according to an outer surface of the envelope of the bottle,
   performing a single stage biaxial orientation blow molding wherein the preform is blown within the cavity through the opened top end, while the mold is heat-set at a temperature between 65° C. and 85° C., the bottle being maintained in contact with the mold for a time period between 0.5 s and 5.0 s to thereby form the final molded bottle.

2. A method according to claim 1, wherein at the step of blowing the preform, the time period is between 1 s and 3 s.

3. A method according to claim 1, wherein at the step of blowing the preform, the blowing pressure is less than or equal to 35 bars.

4. A method according to claim 1, further comprising a step of filling the bottle with a hot content.

5. A method according to claim 1, wherein at the step of filling the bottle, the bottle is filled with a liquid at a hot temperature.

6. The method according to claim 1, wherein the FuranDiCarboxylic Acid (FDCA) monomer is 2,5-FuranDiCarboxylic Acid (2,5-FDCA) monomer.

7. The method according to claim 1, wherein at the step of blowing the preform, the blowing pressure is less than or equal to 30 bars.

8. The method according to claim 1, wherein at the step of blowing the preform, the blowing pressure is less than or equal to 25 bars.

9. The method according to claim 1, wherein at the step of blowing the preform, the blowing pressure is less than or equal to 20 bars.

10. The method according to claim 1, wherein at the step of blowing the preform, the blowing pressure is less than or equal to 15 bars.

11. The method according to claim 1, wherein at the step of blowing the preform, the blowing pressure is less than or equal to 10 bars.

12. The method according to claim 1, further comprising a step of filling the bottle with a hot content at a temperature greater than or equal to 70° C.

13. The method according to claim 1, further comprising a step of filling the bottle with a hot content at a temperature comprised between 75° C. and 100° C.

14. The method according to claim 1, further comprising a step of filling the bottle with a hot content at a temperature comprised between 81° C. and 98° C.

15. The method according to claim 1, further comprising a step of filling the bottle with a hot content at a temperature between 83° C. and 92° C.

16. The method according to claim 1, further comprising a step of filling the bottle with a hot content at a temperature between 83° C. and 88° C.

17. The method according to claim 1, further comprising a step of filling the bottle with a hot content at a temperature between 83° C. and 85° C.

18. The method according to claim 1, wherein at the step of filling the bottle, the bottle is filled with a liquid at a temperature greater than or equal to 70° C.

19. The method according to claim 1, wherein at the step of filling the bottle, the bottle is filled with a liquid at a temperature comprised between 75° C. and 100° C.

20. The method according to claim 1, wherein at the step of filling the bottle, the bottle is filled with a liquid at a temperature comprised between 81° C. and 98° C.

21. The method according to claim 1, wherein at the step of filling the bottle, the bottle is filled with a liquid at a temperature between 83° C. and 92° C.

22. The method according to claim 1, wherein at the step of filling the bottle, the bottle is filled with a liquid at a temperature between 83° C. and 88° C.

23. The method according to claim 1, wherein at the step of filling the bottle, the bottle is filled with a liquid at a temperature between 83° C. and 85° C.

* * * * *